F. & G. F. STEVENS.
SOUNDING APPARATUS.
APPLICATION FILED MAR. 24, 1914.

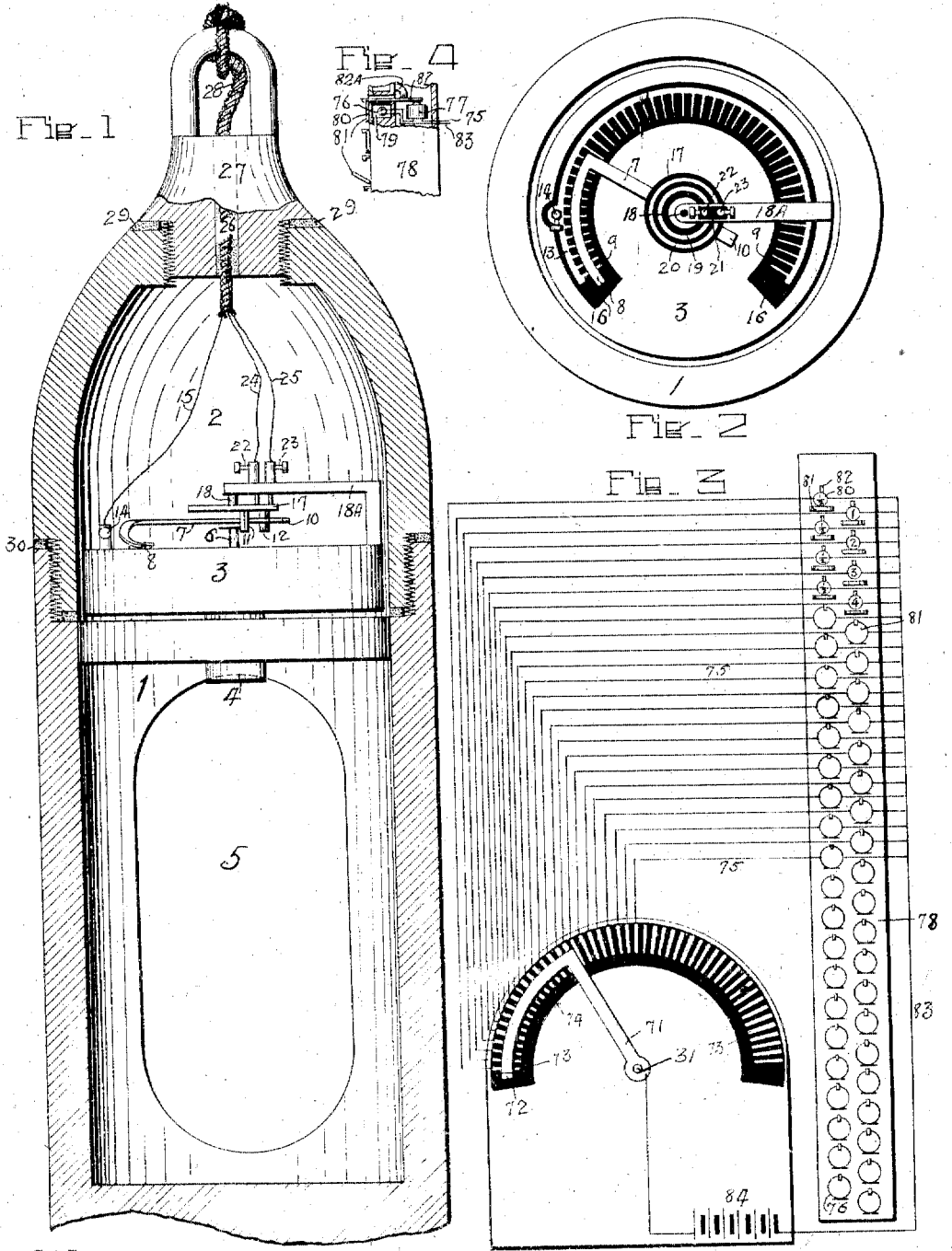

1,233,522.

Patented July 17, 1917.
3 SHEETS—SHEET 2.

Witnesses
G. C. Ensign
L. J. Martin

Frank Stevens
George F. Stevens
by Thos. M. Martin Jr.

INVENTORS

ATTORNEY

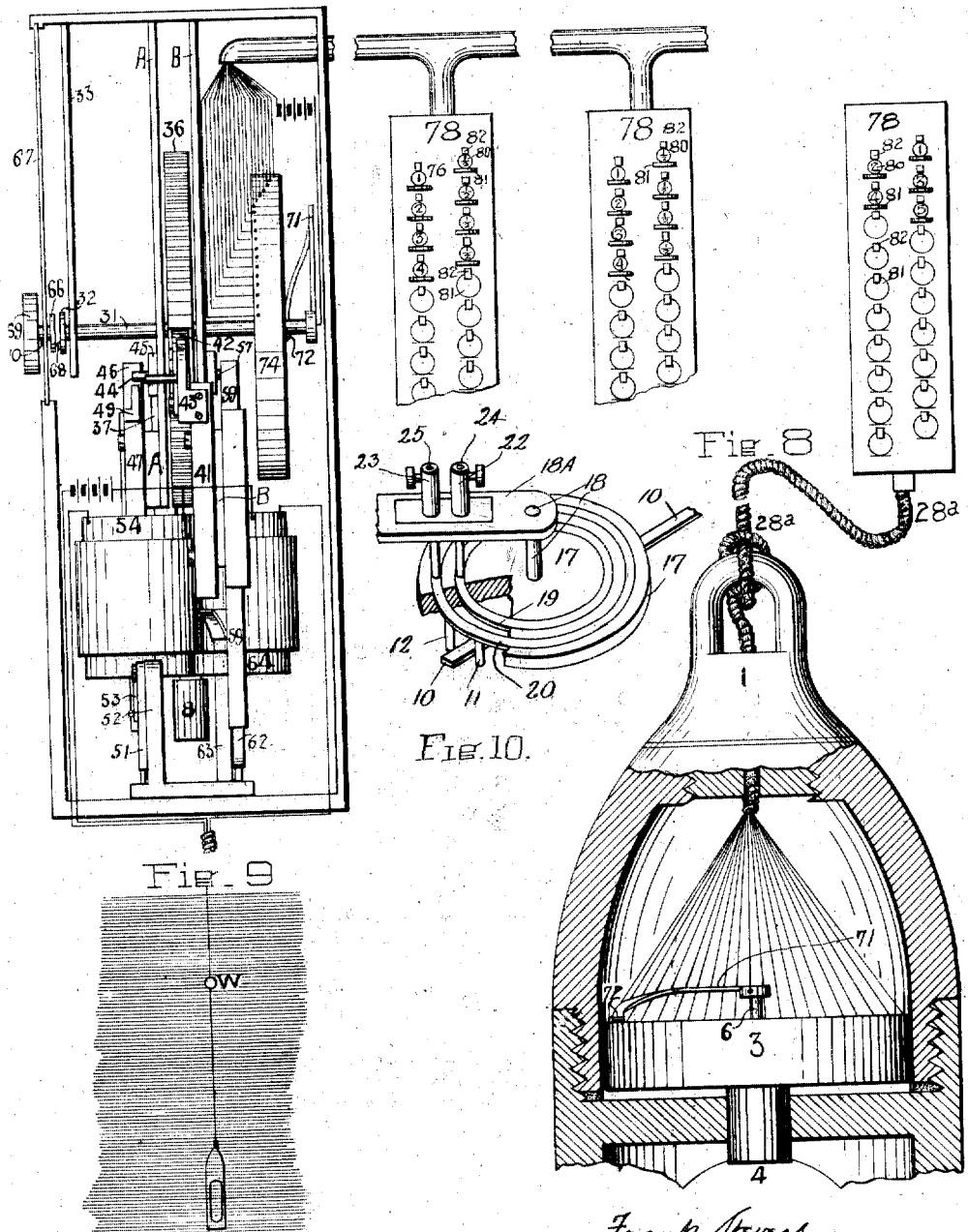

UNITED STATES PATENT OFFICE.

FRANK STEVENS AND GEORGE F. STEVENS, OF PHILADELPHIA, PENNSYLVANIA.

SOUNDING APPARATUS.

1,233,522. Specification of Letters Patent. Patented July 17, 1917.

Application filed March 24, 1914. Serial No. 826,866.

*To all whom it may concern:*

Be it known that we, FRANK STEVENS and GEORGE F. STEVENS, citizens of the United States, residing at Philadelphia, in the county of Philadelphia and State of Pennsylvania, have invented a new and useful Sounding Apparatus, of which the following is a specification.

Our invention relates to instruments for measuring depths of water, and its objects are to provide an apparatus adapted to accurately measure water depths irrespective of the length of line spent, to transmit to the surface and there exhibit and register the depths so measured at the exact instant of their attainment, to operate continuously at varying depths without withdrawal and recasting, and to display depth indications equally clearly in daylight and at night, or in dark places.

For the purpose of attaining these objects we install in a suitable plummet a pressure gage adapted to operate electric switches controlling electric circuits leading to the surface, where these circuits include and actuate suitable indicating and recording instruments, as shown by the mechanism illustrated in the accompanying drawings, in which—

Figure 5:
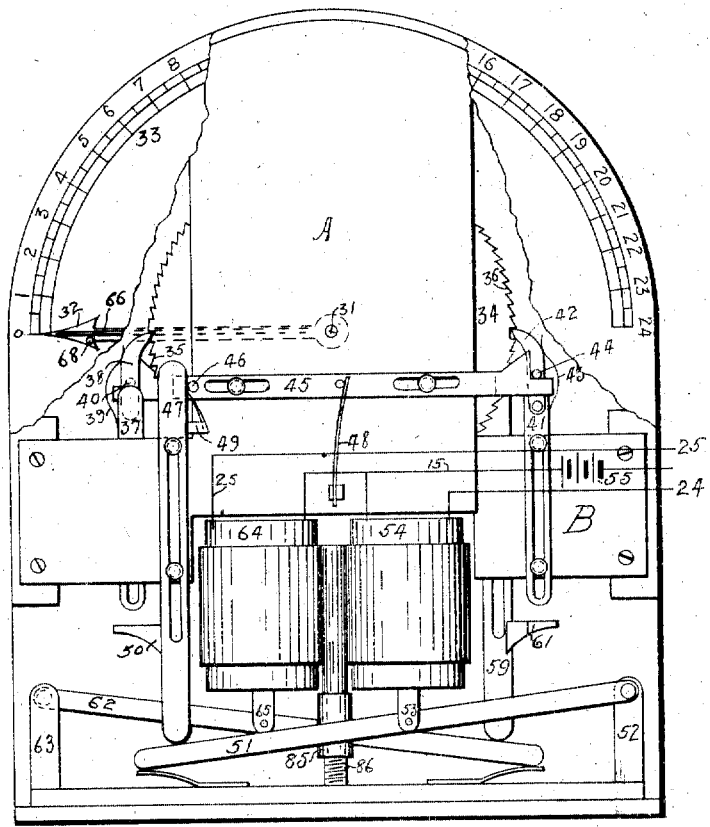
Figure 6:
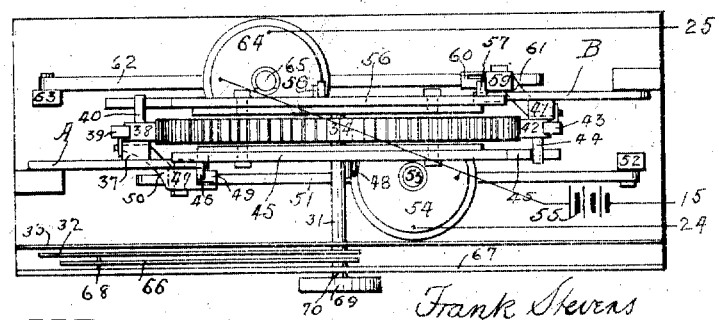

Figure 1 is a vertical section of the plummet showing the gage and switch mechanism; Fig. 2, a plan view of the switch mechanism; Fig. 3, a detail view of the relay-indicator applicable for night use or use in darkened places; Fig. 4, a detail view, partly in section, of a lamp cell used in the same; Fig. 5, a side elevation of the mechanism to operate the indicators, with a dial and arrow to be used in daytime or in lighted stations; Fig. 6, a top view of the same with the outside casing removed; Fig. 7, a side elevation of the same showing attached thereto arrow and dial for daylight indications and relay for night indications; Fig. 8, a modification showing part of the night indicator mechanism installed directly in the sinker and connected electrically with the lamps; Fig. 9, a reduced view showing sounder submerged and a testing or proving attachment fastened to the lead line; and, Fig. 10, a detail perspective view of rotatable member 17, and adjacent parts, with a portion of the insulating bed broken away to show construction of metallic connections.

Similar index characters refer to similar parts throughout the several views.

The electric wiring as drawn is merely diagrammatic to conveniently show the connections between the several elements, and is not, of course, intended to appear as actually installed.

For the purpose of illustrating our invention we have described and shown in the drawings a form thereof at present preferred by us, although it is to be understood that the various instrumentalities, or their equivalents, of which our invention consists can be variously arranged and organized, and that our invention is not to be limited to the precise arrangement, form and organization as shown and described and that we reserve the right to organize and re-arrange these instrumentalities, or their equivalents, within the scope of our invention.

In this construction the weight or plummet, 1, is provided with a chamber, 2, in which is hermetically sealed a pressure gage, 3, with its intake opening, 4, exposed so as to be affected by water pressure through the large openings, 5, made at opposite sides of the plummet, below the opening 4. This plummet may be of any suitable shape or form and of any weight desired, additional material be added by way of elongation as indicated by the broken part in Fig. 1.

We have used a gage of the Bourdon type, but any reliable pressure gage having a movable part adapted to operate an electric switch may be employed.

Fast to the shaft, 6, of the gage, instead of a hand or arrow, we show a contact making-and-breaking member, 7, adapted to have one extremity, 8, travel over a series of contacts, 9, and the other extremity, 10, lie between contact posts, 11 and 12, so that when moved by the action of the gage this end will make contact with either the one or the other. The contacts, 9, are shown as radial teeth of an arc shaped conductor, 13, provided with a binding post, 14, to which a lead, 15 is secured.

This conductor and its teeth, which occupy the place of a dial, are embedded in fiber, hard rubber or other non-conducting substance, 16, so as to be completely insulated from the other parts of the device. The contact posts, 11 and 12, are shown depending from a rotable non-conducting member, 17, loosely centered on a shaft, 18, from a support 18^A. These depending contact posts are extended in annular concentric lines, 19 and 20, on the member 17, so as to always be in contact with the projections of the binding posts, 22 and 23. That is to say, the depending contact post 11, pierces the insulating bed 17 of the rotatable member and is electrically connected so as to be part of the inner metallic ring, 19, and the depending post 12 is similarly a projection from the outer metallic ring, 20. The binding post, 22, extends through the insulating block 21, set in the arm 18 and depends so as to be always in slidable contact with the ring 19, and, similarly, the binding post 23 is always in slidable contact with the ring 20, so that, no matter in which direction the member 17 may be turned, the posts 22 and 23 will always be in electrical connection with the depending contact posts 11 and 12, respectively. The leads 24 and 25 are secured, respectively to the binding posts 22 and 23. The three leads, 15, 24 and 25, are suitably insulated against moisture and are assembled so as to enter into and form a part of the line 28 in the water-tight conduit, 26, in the bail-piece 27, of the plummet, so as to pass outside and be carried thereby to the surface. The bail-piece is removable as shown at 29 so as to facilitate the attaching of the line and the leads. The plummet is also jointed at 30, to permit of the handy installation or examination of the gage and switch. The conduit 26 and the joints 29 and 30 are of course made water-tight by packing, washers, or otherwise, so as to seal-in and protect the gage and switch-mechanism within the chamber 2.

It is evident from what has been said that, as the member 7 is urged by the action of the gage in clockwise direction, the extremity 10 will make contact with the post 11, and the extremity 8 with one of the series of contacts 9, so as to electrically connect the leads 15 and 24; and, as the member 7 advances away from zero over successive contact teeth 9, a series of such electrical connections between said leads will be intermittently established and broken. Similarly, whenever member 7 is returned toward zero, the extremity 10 will lose contact with the post 11 and make contact with post 12, whereupon the leads 15 and 25 will be intermittently connected and disconnected. Now assuming that each of the two circuits, viz. 15 and 24, and 15 and 25,—15 being, for example, a common negative—is otherwise closed, and includes a battery or other source of electro-motive force, it is evident that when member 7 advances from zero a series of impulses will pass through the former circuit, and when it recedes toward zero, a series of impulses will pass through the latter.

The leads 15, 24 and 25, being carried by the line 28, from the bail-piece to the surface, are run to the instruments necessary to complete the operation by indicating and recording the actual depths attained. This may be accomplished by using any appropriate combination of electro-mechanical devices. In Figs. 5 and 6, we show an indicator for use in daytime, or in lighted stations, consisting of an arrow, 32, a dial, 33, and actuating mechanism. This form of annunciator is operated directly by the current from the submerged gage. The dial shows fathoms and half-fathoms, up to 24 fathoms, corresponding with the number of contact teeth 9. The construction of the actuating mechanism, operated by the impulses from the gage as mentioned, is as follows:

A shaft, 31, having its bearings in the frame plates A and B, carries on its outer end an arrow, 32, adapted to describe a path along arc 33, which is graduated as mentioned in half-fathoms. Centered on said shaft between the frame plates is a ratchet wheel, 34, having one-half of its teeth, 35, pointed in one direction to advance the wheel clockwise, and the other half of the teeth, 36, pointed in the opposite direction to reverse the rotation. A vertical pawl carrier, 37, is slidably studded to the frame plate A, and is provided with a pawl, 38, normally held, by spring 39, into engagement with a clockwise tooth, 35. This pawl has a lateral horizontally projecting pin, 40. Similarly, mounted on pawl carrier, 41, which is slidably studded to frame plate B, is the pawl 42, normally held, on the opposite side of the ratchet-wheel, 34, into engagement with a reversing tooth, 36, by the spring, 43, and provided with a lateral pin, 44. A horizontal rod, 45, slidably studded to plate A, is adapted at one end to engage pin 44 and when moved toward the pin, to throw the pawl, 42 away from the ratchet wheel and out of engagement with teeth, 36, whereby the wheel is left free to be rotated by the pawl 38. Near the other end of the horizontal rod, 45 is a pin or roller, 46. Nearby and parallel with the pawl-carrier 37, is the lifting rod 47, also slidably studded to the frame-plate, A. The pin, 46, is normally held into contact with this lifting rod, by the action of spring, 48. Adjacent to this point of contact is a spring cam-acting member, 49, adapted when raised to force the rod, 45, toward the pawl, 42, by wedging the pin 46 away from rod 47, and, as this raising continues, to hold the pawl, 42, away from the wheel, until the cam 49 has upwardly advanced past the pin, 46, whereupon the rod 45, under the combined action of springs 48 and 43, snaps back and the pawl 42 again engages a tooth 36. This cam member, 49, is shaped so that on the downward movement of the lifting rod, 47, the pin 46 will pass between it and the lifting rod, springing it aside at the contact point and escaping to its normal position beyond the tip of the cam. This arrangement causes the upward motion of the rod 47 to remove pawl 42, and allows the downward movement to take place without disturbing the pawl.

A projection, 50, is so positioned on rod 47, that when being raised it engages the pawl carrier, 37, and elevates it so as to transmit a motion to pawl 38 sufficient to turn the ratchet wheel the distance of one tooth, whereby the arrow, 32, is advanced one-half fathom. Of course, this progress is made while the pawl, 42, is out of engagement with the ratchet-wheel as described.

The actuating member in the operation just described is the lever 51, pivoted at one end to a standard, 52, from the case, articulated to the core, 53, of the solenoid magnet, 54, and having its other end positioned directly beneath the lifting rod, 47. The magnet 54 forms the closed terminal of circuit made by wires 15 and 24, a battery, 55, being shown on the line 15. Any influx of current through magnet 54 will cause it to draw in the core 53, pull up the lever 51 and thus actuate the rod 47 and all its dependent mechanism with the result of advancing the arrow one-half fathom.

To operate the arrow in the reverse direction, so that it may instantly follow the movements of the submerged contacting member 7, a duplicate set of parts is employed to act on the opposite side of the ratchet-wheel, 34. These are shown in the horizontal rod, 56, (best seen in Fig. 5) the pin, 57, thereon, the spring, 58, thereto; the lifting rod, 59, with its cam, 60, and pawl elevating projection, 61; the actuating lever, 62, pivoted to standard 63, and magnet 64 and its core 65, loosely jointed to lever 62. Therefore, when member 7 commences to return toward zero in the plummet, by reason of the reduction of pressure in the gage 3, a current is sent through magnet 64, by wires 15 and 25, whereupon takes place an operation similar to that just described as caused by magnet 54, but resulting in moving the ratchet wheel 34 in a reverse direction and thus returning the arrow 32 one step toward zero. In order to accurately set the lever and magnets so as to operate with proper timing, it is convenient to have the support for the latter made adjustable in some appropriate way, as, by the threaded sleeve 85 rotatable on the fixed screw-post 86.

By all this it will be seen that the arrow 32, must, at all times, indicate the precise position of member 7 relative to contacts 9, and, as the arc is graduated to substitute for and represent a dial to indicate the pressure exerted by the water at given depths, the dial 33 must always indicate the exact depth attained and show it at the exact instant of attainment.

To mark the greatest depth attained, an idle hand or pointer, 66, is rotatably centered in the glass dial cover, 67, (Fig. 5) concentric with the arrow, so as to be moved clockwise by the pin 68 thereon, as it advances from zero, and left behind at the deepest point when the arrow recedes. This registering hand, 66, is reset by turning the external milled-head 69 on shaft 70, to which the hand is fast.

For use at night on the deck or the bridge of a vessel, or in any darkened station we provide the form of indicator shown in Figs. 3 and 4, in which very subdued lights are used. Instead of attaching the arrow 32, we center the switch-arm 71, on the shaft 31, so as to be operated by the ratchet-wheel 34, in a manner precisely similar to the operations on the arrow. This arm closely resembles in design the member 7, and its functions are almost similar to those of that member. As it is rotated by the electro-mechanical construction already described with regard to the arrow 32, its extremity, 72, comes into contact with radially arranged contacts, 73, inlaid in an insulating arc, 74. These contacts correspond with the contacts 9, in the sounder, and with the graduations on the dial 33. They are, however, insulated from each other and from the surrounding metallic parts, and a separate and distinct lead, 75, connects each contact with a small lamp, 76, and an electromagnet, 77. These lamps and magnets are arranged in a bank, 78, and each lamp is inclosed in a separate chamber, 79, so as to show through only a small translucent window or screen, 80, on which is opaquely marked the appropriate depth in fathoms or halves. Each screen is normally covered by a shutter, 81, (Fig. 4) held in position by a latch, 82, which is pivoted intermediately, nearer to the magnet end, so that by gravity it will, at one end, retain the shutter in front of the screen, but so positioned that the other end will project over the magnetic pole and be attracted thereby when the magnet is excited. When this excitation occurs the latch, moving on its fulcrum, releases the shutter which drops outwardly by its own weight and discloses the lighted indicating screen. The return side of all these lamp and magnet circuits is the common lead 83, therefrom to the axis of the switch-arm, 71, which includes a battery, 84, or other generator. The extremity, 72, is so flattened as to cover two poles, 73, at the same time, in order that, once the arm is started, no one of the lamps 76, will be extinguished until an adjacent lamp is lighted, whereby, while the operation of making a sounding is progressing, one lamp will always shine.

Obviously, the circuit supplying current to the lamps and magnets in the night indicator as herein described, is separate and distinct from that controlled by the member 7, in the plummet, and this form of indicator is substantially a relaying instrument to control lamp circuits synchronously with the circuit from the gage actuated switch. Although it is preferable to have the dial actuating mechanism separate and distinct from that which actuates the lamp system, so that both the dial form which may be employed within a vessel, as in the engine-rooom, and the lamp form used in the pilot house or on the bridge, may checkup each other, it is not actually essential. The switch-arm 71 may be centered on shaft 31 of the same apparatus as operates a needle and dial, and the arc 74 containing the poles 73 be positioned to be in contact therewith, and the separate battery and wiring installed. The lamps may be located anywhere; in the same station as the dial, or elsewhere; or, any number of banks of lamps, as in the case of dials, may be employed so as to indicate at various stations, in the form most appropriate to the locations.

It is also evident that, by running the necessary number of wires from the surface to the plummet, the arm 71 and poles 73 may be installed directly on the gage to be operated thereby, in lieu of the three wire system herein described, and the lamps and magnets actuated by the currents therefrom without the use of the solenoids 54 and 64 and their attendant mechanical parts.

When the night indicator is operating, as each lamp is lighted by the clockwise motion of the arm 71, its inclosing shutter drops open, and thus marks the greatest depth attained, for, as the depth decreases and the lighting process recedes toward zero, the lamps will burn in reverse order, but all released shutters will remain open until reset by hand, and the last open one will show the greatest depth attained during the operation, irrespective of whatsoever lamp may be burning at any given stage.

Any number of stations, at various places may be established for taking readings, by simply making branch circuits. As, if used on a large steam-ship, one may be in the pilot-house, another in the engine room, and still another on deck near the place of casting the line; or, a portable indicator may be attached by flexible leads and carried from place to place.

Likewise, the location and character of the generator is optional, and, as already mentioned, the wiring shown is merely diagrammatic. On small boats, where a comparatively light, portable apparatus would be most suitable, the battery may be included within the plummet itself, or in the hand cabinet in which the receiving instrument is incased. On large vessels, where it may be found expedient to have several established receiving stations, at varying distances apart, current may be taken from a dynamo or other source at hand.

The working condition of the sounder may be tested by having attached to the lead line, 28, at a measured distance, for example, three fathoms from the plummet, a white ball W, (Fig. 9) or other object adapted, on approaching the surface when being reeled in, to attract the attention of the observer, so that before the line is entirely withdrawn from the water, a comparison may be made with the indicator. If the indicator then corresponds with the measured distance shown by the white ball, or other object used, due allowance being made for any obliquity of the line, it should be a very fair indication that the pressure gage and switch in the plummet are in accurate working condition after the operation, and that, consequently, the various depths previously recorded are reliable and correct.

It is evident that other electrically actuated means may be substituted as equivalents for the mechanism herein described without departing from the scope of our invention. The obviously important advantage of our device is that it shows the true vertical depth, at the exact instant of its attainment, regardless of length of line out, and that there is no delay in obtaining readings, which may be had with equal facility in daylight or darkness without the aid of auxiliary lights, nor can there be liability to error by reason of accident, mistake, or miscalculation in reeling in.

Having thus explained the nature of our invention and described and shown a manner of constructing the same, although without attempting to fully set forth all the forms in which it may be constructed or all the modes of its use, we claim and desire to secure by Letters Patent—

1. In a sounding device, in combination, a sinker, electrical actuating circuits leading thereto, means, carried thereby, adapted to be so operated by water pressure as to close and open different circuits with the rise and fall, respectively, of said sinker, and means included in said circuits to indicate such rise and fall.

2. In a sounding device, in combination, a sinker, electrical actuating circuits leading thereto, means, carried thereby, adapted to be so operated by water pressure as to close and open different circuits with the rise and fall, respectively, of said sinker, means increased in said circuits to indicate such rise and fall and other means actuated by said circuit to reproduce such indications at divers locations.

3. In a sounding device, in combination, a sinker, a movable member carried thereby and adapted to be oscillated by varying water pressure, an electrically actuated indicator, means thereon adapted to oscillate and intermediate electrical actuating circuits adapted to be alternately excited by the oscillation of said movable member and to synchronously oscillate said indicator means.

4. In a sounding device, in combination, a sinker, a movable member carried thereby and adapted to be oscillated by varying water pressures, an electrically actuated indicator, oscillatory means thereon adapted to make indications, intermediate electrical actuating circuits adapted to be alternately excited by the oscillation of said movable member and to synchronously oscillate said indicator means, an oscillating relay arm actuated synchronously by said circuits, means actuated by the oscillation of said arm to reproduce at divers locations. the movements of the oscillatory member carried by said sinker.

5. In a sounding device, in combination, a sinker, electric actuating circuits, means carried by said sinker adapted to be influenced by water pressure so as to control the flow of current through said circuits, a relay actuated by said currents, other circuits the currents in which are controlled by said relay, indicators in said latter circuits adapted to be operated thereby in synchrony with the flow of current through said former circuits.

6. In a sounding device, in combination, a sinker, an element carried thereby adapted to be oscillated by the rise and drop of said sinker in water, an oscillatory relay arm, adapted to be operated by electricity, electrical conductors between said element and said arm, means actuated by currents introduced into said conductors by the motion of the former to cause the latter to oscillate synchronously with the former, a plurality of oscillatory indicators adapted to be actuated by electricity, electrical actuating connections between said relay arm and said indicators including means whereby the latter are caused to oscillate synchronously with the former and with each other.

7. In a sounding device, in combination, a sinker, a movable member carried thereby and adapted to travel by water-pressure: in one direction when said pressure is increasing and in a reverse direction when said pressure is decreasing; a switch adapted to be so operated by the movements of said member as to introduce an electric current into a given circuit when said pressure is increasing and to shift said current into a different circuit when said pressure changes to diminishing, electrically actuated indicating means adapted to show said changes of pressure, electrical conductors between said switch and said indicating means whereby the latter is caused to operate in one direction when said pressure is increasing and in a reverse direction when said pressure is decreasing.

8. In a sounding device, in combination, a pressure-gage carried by a sinker, a duplex electric switch operated by said gage, an electro-mechanical indicating device adapted to operate in both directions and actuating electrical conductors connecting said switch with said indicating device, substantially as and for the purposes described.

9. In a sounding device, in combination, a pressure gage carried by a sinker, a duplex electric switch operated by said gage, an electro-mechanical relaying device adapted to operate both ways, electro-mechanical indicators adapted to operate in both directions, actuating electrical conductors connecting said switch with said relay, and other actuating electrical conductors connecting said relay with said indicators, substantially as and for the purposes described.

10. In a sounding device, in combination, a sinker, an electric switch carried thereby, pressure controlled actuating means adapted to cause said switch to make contact in one direction when said sinker is descending and to make contacts in the opposite direction when said sinker is ascending, electro-magnets, electrical conductors between said switch and said magnets, an indicator, means actuated by said magnets to advance said indicator when said switch is contacting in one direction and to return said indicator when said switch is contacting in the opposite direction.

11. In a sounding device, in combination, a sinker, an electric switch carried thereby, pressure-controlled actuating means adapted to cause said switch to make contact in one direction when said sinker is descending and to make contact in the opposite direction when said sinker is ascending, electro-magnets, electrical conductors between said switch and said magnets, a contact piece, a plurality of electric lamps having their conductor terminals grouped in a series so as to be traversed by said contact-piece while it is reciprocating, means actuated by said magnets to advance said contact-piece when said switch is making contact in one direction and to return said contact-piece when said switch is making contact in the opposite direction.

12. In a sounding device, in combination, a sinker, pressure controlled actuating mechanism carried thereby, a forward-and-backward-acting electric switch operated by said mechanism, a conductor having a series of terminal contacts arranged contiguous to said switch so as to be traversed thereby, electro-magnets, a forward-and-backward-acting indicator, intermediate actuating mechanism between said magnets and said indicator, conductors from said magnets to said first mentioned conductor and conductors from said magnets to said switch, whereby said magnets are caused to carry said indicator forward and backward synchronously with the forward and backward action of said switch.

13. In a sounding device, in combination, a sinker, pressure controlled actuating mechanism carried thereby, a forward-and-backward-acting electric switch operated by said mechanism, a conductor having a series of terminal contacts arranged contiguous to said switch so as to be traversed thereby, electro-magnets, a forward-and-backward-acting contact member, intermediate actuating mechanism between said magnets and said member, conductors from said magnets to said first mentioned conductor and conductors from said magnets to said switch whereby said magnets are caused to carry forward and backward said contact member synchronously with the forward and backward action of said switch, a plurality of electric lamps having their conductor terminals grouped in a series so as to be traversed by said contact member, whereby said lamps are successively and in each direction lighted and darkened in synchrony with the actions of said switch.

14. In a sounding device, in combination, a sinker, an electric switch carried thereby, pressure controlled actuating means adapted to cause said switch to make contact in one direction when said sinker is descending and to make contact in the contrary direction when said sinker is ascending, electromagnets, electrical conductors including a source of electromotive force between said switch and said magnets, a shaft, a reciprocable indicator actuated thereby, a reciprocable contact-arm actuated thereby, a plurality of electric lamps including a source of electromotive force having their conductor terminals arranged in succession contiguous to said arm so as to be traversed in both directions thereby, means actuated by said magnets to rotate said shaft in one direction when said switch is acting in that direction and to rotate said shaft in the contrary direction when the action of said switch is in the contrary direction, whereby said indicator is caused to reciprocate, and said lamps are successively lighted and darkened, in like directions and synchronously with the reciprocations of said switch and with each other.

15. In a sounding device, in combination, a sinker, a guide-line to control the same, a plainly visible depth marker on said line, a pressure gage in said sinker adapted to operate a duplex electric switch whereby a circuit is established when said sinker is descending and a different circuit is established when said sinker is ascending in water, an electro-mechanical indicator adapted to operate in both directions, conductors between said switch and said indicator so connected as to advance said indicator when said sinker is descending in water and to return said indicator when said sinker is ascending in water, an idler recording-piece adapted to be urged forward by the forward motion of said indicator but to remain unaffected by its return, a contact member actuated by said indicator so as to alternate synchronously therewith, a plurality of inclosed electric lamps including a source of electromotive force having their conductor terminals arranged in succession contiguous to said contact member so as to be successively lighted and darkened by the reciprocations thereof, and means in each lamp circuit and actuated by its current to expose each lamp as lighted, all substantially as and for the purposes described.

FRANK STEVENS.
GEORGE F. STEVENS.

Witnesses:
ALBERT S. WRAY,
W. J. WRAY.